(12) United States Patent
McGriff et al.

(10) Patent No.: US 8,973,616 B2
(45) Date of Patent: Mar. 10, 2015

(54) MODIFIED PIPE INLET

(75) Inventors: Don McGriff, Huntsville, AL (US); Tim Toliver, Northfield, OH (US)

(73) Assignee: ISCO Industries, Inc., Louisville, KY (US)

( * ) Notice: Subject to any disclaimer, the term of this patent is extended or adjusted under 35 U.S.C. 154(b) by 84 days.

(21) Appl. No.: 13/168,583

(22) Filed: Jun. 24, 2011

(65) Prior Publication Data

US 2012/0073692 A1 Mar. 29, 2012

Related U.S. Application Data

(60) Provisional application No. 61/358,283, filed on Jun. 24, 2010.

(51) Int. Cl.
| | | |
|---|---|---|
| *B65D 59/00* | (2006.01) | |
| *B65D 59/06* | (2006.01) | |
| *F15D 1/04* | (2006.01) | |
| *F16L 9/00* | (2006.01) | |

(Continued)

(52) U.S. Cl.
CPC ............. *E03F 3/04* (2013.01); *E03F 2003/065* (2013.01); *F16L 55/1657* (2013.01)
USPC ............................. 138/96 R; 138/39; 138/109

(58) Field of Classification Search
CPC ... E03F 3/04; E03F 2003/065; F16L 55/1657; F28F 19/002
USPC .......... 138/98, 96 R, 96 T, 37, 38, 39, 40, 41, 138/42, 43, 44, 45, 46, 109
See application file for complete search history.

(56) References Cited

U.S. PATENT DOCUMENTS

| 80,313 | A | * | 7/1868 | Sinclair | ........................ | 285/213 |
| 199,349 | A | * | 1/1878 | Caswell | ........................ | 138/39 |

(Continued)

FOREIGN PATENT DOCUMENTS

| EP | 0204272 A2 | | 12/1986 |
| JP | 08224591 | * | 2/1995 |

(Continued)

OTHER PUBLICATIONS

ISA/KR, International Search Report and Written Opinion for corresponding international application PCT/US2011/041849.

(Continued)

*Primary Examiner* — Patrick F Brinson
*Assistant Examiner* — Matthew Lembo
(74) *Attorney, Agent, or Firm* — Stites & Harbison, PLLC; David W. Nagle, Jr.

(57) ABSTRACT

A pipe, such as a liner for repairing a failing culvert, comprises a continuous wall defining an inner wall surface and an exterior wall surface. The pipe further defines a central fluid passageway extending from an inlet end to an outlet end. The inner wall surface of the pipe defines a waveform-like geometry near the inlet end, said waveform-like geometry including an initial curvature beginning at the inlet end of the pipe and continuing until reaching a predetermined location where an inner diameter of the pipe is minimized, the curvature then continuing with the inner diameter increasing again to a second predetermined location, before the inner diameter again decreases to a third predetermined location and then remains substantially constant along the remaining length of the pipe, thus creating an annular recess in the inner wall surface of the pipe.

15 Claims, 10 Drawing Sheets

(51) Int. Cl.
*F16L 11/00* (2006.01)
*E03F 3/04* (2006.01)
*F16L 55/165* (2006.01)
*E03F 3/06* (2006.01)

(56) References Cited

U.S. PATENT DOCUMENTS

| | | | | |
|---|---|---|---|---|
| 2,095,528 | A | * | 10/1937 | Osborn et al. ............... 138/96 T |
| 2,157,107 | A | * | 5/1939 | Bay ............................... 285/213 |
| 2,195,403 | A | * | 4/1940 | Bay ............................... 285/213 |
| 2,225,615 | A | * | 12/1940 | Bay ............................... 285/55 |
| 2,375,180 | A | * | 5/1945 | Vigo ............................. 417/151 |
| 3,073,352 | A | * | 1/1963 | Bay ............................... 138/140 |
| 3,317,222 | A | * | 5/1967 | Maretzo ........................ 285/55 |
| 3,758,361 | A | * | 9/1973 | Hunter .......................... 156/287 |
| 3,765,623 | A | * | 10/1973 | Donelson et al. ........... 244/53 B |
| 4,046,492 | A | * | 9/1977 | Inglis ............................ 417/197 |
| 4,192,461 | A | * | 3/1980 | Arborg ..................... 239/265.17 |
| 4,195,780 | A | * | 4/1980 | Inglis ............................ 239/73 |
| 4,373,344 | A | * | 2/1983 | Hinn .............................. 62/62 |
| 4,505,017 | A | * | 3/1985 | Schukei ................... 29/890.031 |
| 4,513,903 | A | * | 4/1985 | Feldstein et al. ............. 228/107 |
| 4,559,275 | A | * | 12/1985 | Matt et al. .................... 428/596 |
| 4,592,577 | A | * | 6/1986 | Ayres et al. ................ 285/288.1 |
| 4,691,740 | A | * | 9/1987 | Svetlik et al. ................. 138/109 |
| 4,779,902 | A | | 10/1988 | Lee |
| 4,838,618 | A | * | 6/1989 | Blackmon, Jr. ................ 303/66 |
| 4,875,714 | A | | 10/1989 | Lee |
| 4,964,733 | A | * | 10/1990 | Fredriksson et al. ......... 366/336 |
| 5,093,059 | A | * | 3/1992 | Nathoo et al. ................ 264/121 |
| 5,174,113 | A | * | 12/1992 | Deville ........................... 60/309 |
| 5,307,830 | A | * | 5/1994 | Welker ............................ 137/1 |
| 5,378,524 | A | * | 1/1995 | Blood ............................ 428/141 |
| 5,595,457 | A | | 1/1997 | Stucks |
| 5,970,963 | A | * | 10/1999 | Nakase et al. ................ 123/590 |
| 6,319,458 | B1 | * | 11/2001 | Jung et al. ..................... 266/266 |
| 7,052,210 | B2 | | 5/2006 | Kurdziel |
| 2005/0229982 | A1 | | 10/2005 | Gonzales |
| 2005/0241605 | A1 | * | 11/2005 | Bedwell et al. .......... 123/184.21 |
| 2005/0274103 | A1 | * | 12/2005 | Prasad et al. ................. 60/226.1 |

FOREIGN PATENT DOCUMENTS

| | | |
|---|---|---|
| JP | 08-224591 A | 9/1996 |
| JP | 2002-018957 A | 1/2002 |

OTHER PUBLICATIONS

Snap-Tite Design Guide, 2009, v. 3.1, available at www.culvert-rehab.com/pdfs/2009_manual.pdf.

* cited by examiner

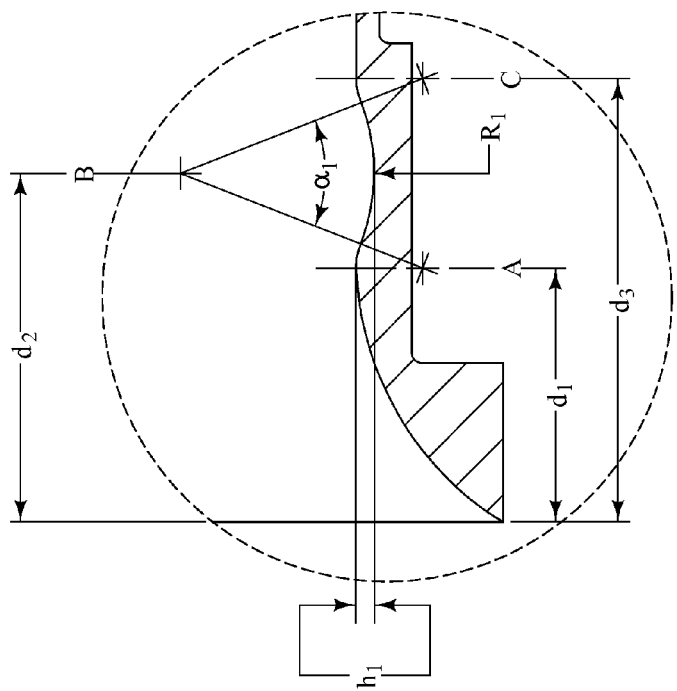
FIG. 6
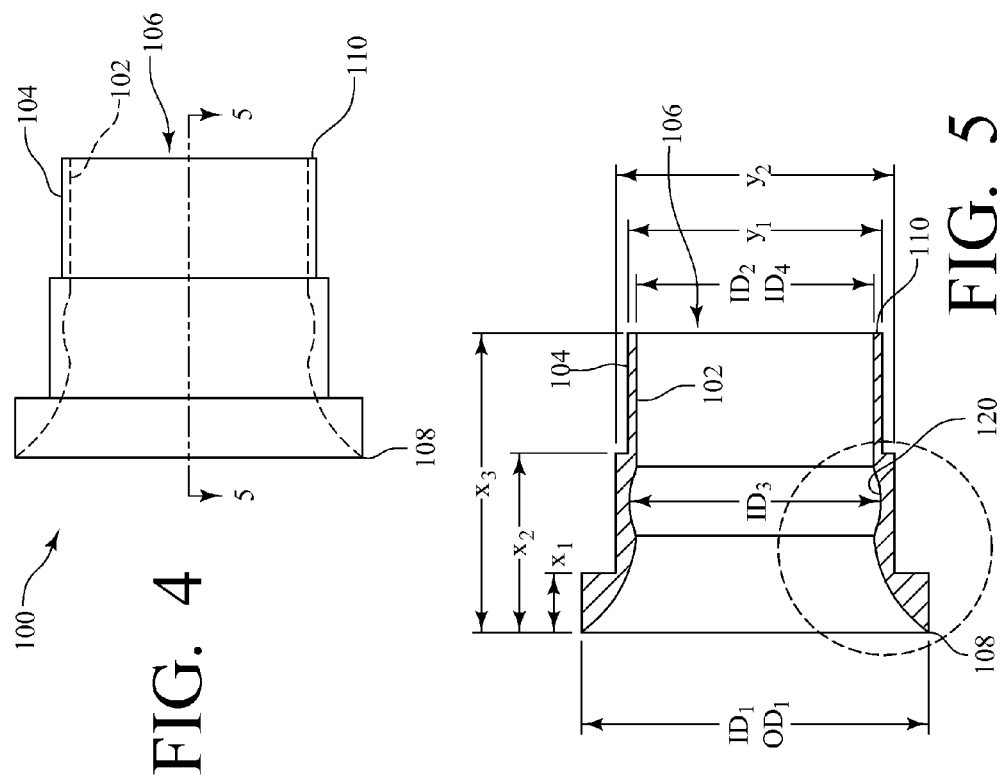
FIG. 4
FIG. 5

MODIFIED PIPE INLET

CROSS-REFERENCE TO RELATED APPLICATIONS

The present application claims priority to U.S. Provisional Patent Application Ser. No. 61/358,283 filed on Jun. 24, 2010, the entire disclosure of which is incorporated herein by reference.

BACKGROUND OF THE INVENTION

The present invention pertains to a modified pipe inlet for improving flow through a pipe, such as a liner for repairing a failing culvert.

Culvert lining systems are designed as a solution for repairing failing culverts without requiring removal of existing pipe by excavation. Since much of the highway system in the United States was built in the 1950s, culverts built under the roads were often made of either corrugated metal or concrete, which each have a design life of 45-50 years. Repairing such culverts before they enter a critical state of collapse is important for the continuing safety of the road above.

To repair a failing culvert, one common technique is to install a liner inside of the culvert. For example, and referring now to FIG. 1, when the culvert is in the form of a corrugated metal pipe 10, a liner 20 of a slightly smaller diameter can be inserted into and installed in the pipe 10. ISCO Industries, LLC, the assignee of the present application, markets and describes one such culvert lining system for repairing failing culverts under the SnapTite® trademark. In the SnapTite® Culvert Lining System, the liner 20 is generally comprised of a continuous wall defining an inner wall surface and an exterior wall surface, and further defining a central fluid passageway extending from an inlet end to an outlet end. In many applications, the liner 20 is cylindrical and has a circular cross-section, but in some applications, the liner 20 may have an elliptical cross-section. In any event, once the liner 20 has been installed, a grout mixture 30 is packed into the annular space between the pipe 10 and the liner 20. Grouting of the annular space is important not only in securing the liner 20 relative to the pipe 10, but also helps to stabilize the surrounding soil and minimizes the potential for settlement or collapse of the road. The grout mixture 30 also provides additional support to the pipe 10 and increases the collapse strength of the liner 20.

Referring now to FIG. 2, once the liner 20 has been installed, the flow capacity of the rehabilitated culvert is equal to or better than that of the failing culvert in a low-flow condition.

Referring now to FIG. 3, in a heavy storm or other full-flow event, when the liner 20 is full of fast-flowing water, turbulence creates small eddies or countercurrents just inside of the inlet. This turbulence actually constricts the flow of the influent, reducing the effective diameter of the liner 20 and the flow capacity at this location. This reduction in the effective diameter is typically referred to as a vena contracta, i.e., the point in a fluid stream where the diameter of the stream is minimized.

The flow rate can be modified to some extent by altering the inlet or outlet conditions in the culvert. In most cases, the outlet conditions are difficult to alter. The focus thus shifts to altering the inlet conditions.

In most current constructions, such as in the SnapTite® Culvert Lining System described above, the inner diameter of the liner is substantially constant along the length of the liner. In other words, there is no curvature or contour at or near the inlet end of the liner, nor any curvature or contour anywhere along the length of the liner.

In some pipe constructions, a curvature may be provided at the inlet end in an effort to reduce head losses. For example, U.S. Patent Publication No. 2005/0229982 describes a device that is "force fit into opening 32 of a pipe . . . and extends from neck 52 to lip 51, thereby defining a fluid passage having a rounded, gradually curving mouth 54." See Paragraphs [0030]-[0031].

Nonetheless, there still remains a need for a modified pipe inlet that would minimize any constriction and improve flow through a pipe, such as a liner for repairing a failing culvert.

SUMMARY OF THE INVENTION

The present invention is a modified pipe inlet for improving flow through a pipe, such as a liner for repairing a failing culvert. This can be achieved by modifying the liner itself or by an attachment that is mated to the liner. In either event, the inner wall surface of the liner or attachment is provided with a waveform-like geometry at the inlet end. Specifically, the waveform-like geometry includes an initial curvature beginning at the inlet end and continuing until reaching a predetermined location where the inner diameter of the liner is minimized, the curvature then continuing with the inner diameter increasing again to a second predetermined location, before the inner diameter again decreases to a third predetermined location and then remains substantially constant along the remaining length of the liner or attachment, thus creating an annular recess in the inner wall surface of the liner or attachment.

In one exemplary embodiment, an attachment for a liner made in accordance with the present invention has a continuous wall defining an inner wall surface and an exterior wall surface. The attachment further defines a central fluid passageway extending from an inlet end to an outlet end. The inner wall surface of the attachment is provided with a waveform-like geometry at the inlet end. Specifically, the waveform-like geometry includes an initial curvature beginning at the inlet end and continuing until reaching a predetermined location where the inner diameter of the liner is minimized, the curvature then continuing with the inner diameter increasing again to a second predetermined location, before the inner diameter again decreases to a third predetermined location and then remains substantially constant along the remaining length of the liner or attachment, thus creating an annular recess in the inner wall surface of the liner or attachment.

In repairing a failing culvert, a liner is inserted into and installed in a pipe. The attachment is then inserted into the pipe and mated with the liner. Furthermore, and similar to the prior art constructions discussed above, a grout mixture is packed into the annular space between the pipe and the liner to secure the liner relative to the pipe and to stabilize the surrounding soil. In a full-flow event, the initial curvature at the inlet end of the attachment helps to transition the flow from a large area outside of the culvert and into the central fluid passageway of the attachment. Then, the annular recess created in the inner wall surface accommodates and effectively moves the small eddies or countercurrents inside of the inlet end out of the way of the streamlined flow.

To the extent that such an attachment is used, the present invention may also be characterized as a liner system that includes a liner and the attachment mated to the liner.

Furthermore, it should again be recognized that the same result can be achieved by modifying the liner itself, rather than securing an attachment to a liner. In such cases, the inner wall surface of the liner is provided with the waveform-like geometry at the inlet end, such that there is annular recess created in the inner wall surface of the liner.

Finally, although the modified pipe inlet described above has a particular applicability to culvert repair and the use of a liner, it is contemplated that a similar inlet modification could be used in other pipes or conduits for various storm water and drainage applications.

DESCRIPTION OF THE DRAWINGS

FIG. 4 is a view of an exemplary attachment for a liner made in accordance with the present invention;

FIG. 5 is a sectional view of the exemplary attachment of FIG. 4, taken along line 5-5 of FIG. 4;

FIG. 6 is an enlarged view of a portion of the sectional view of FIG. 5;

DETAILED DESCRIPTION OF THE INVENTION

Figure 1:
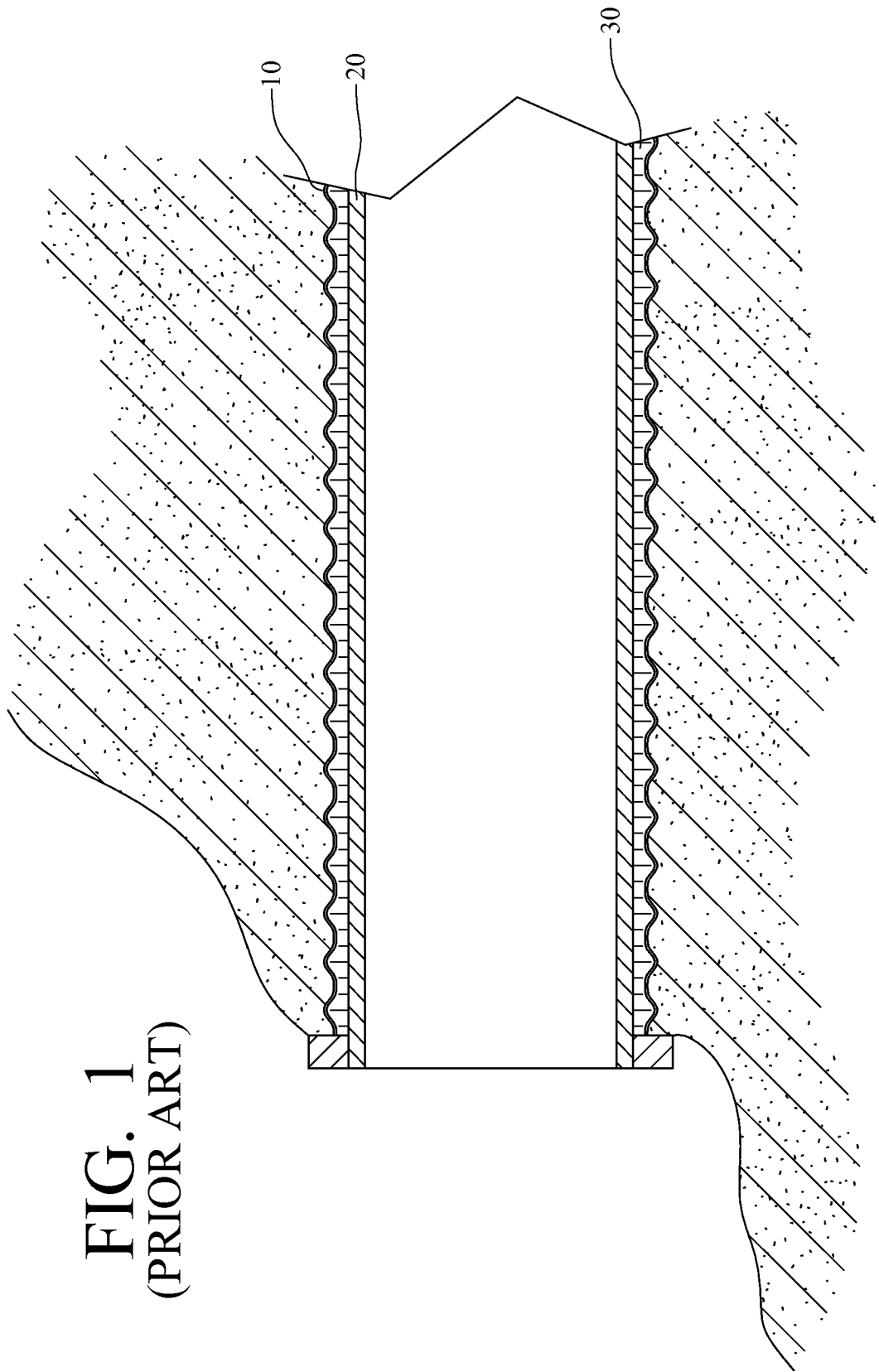
FIG. 1 is a sectional view of a liner installed in a corrugated pipe of a culvert in a prior art construction.
Figure 2:
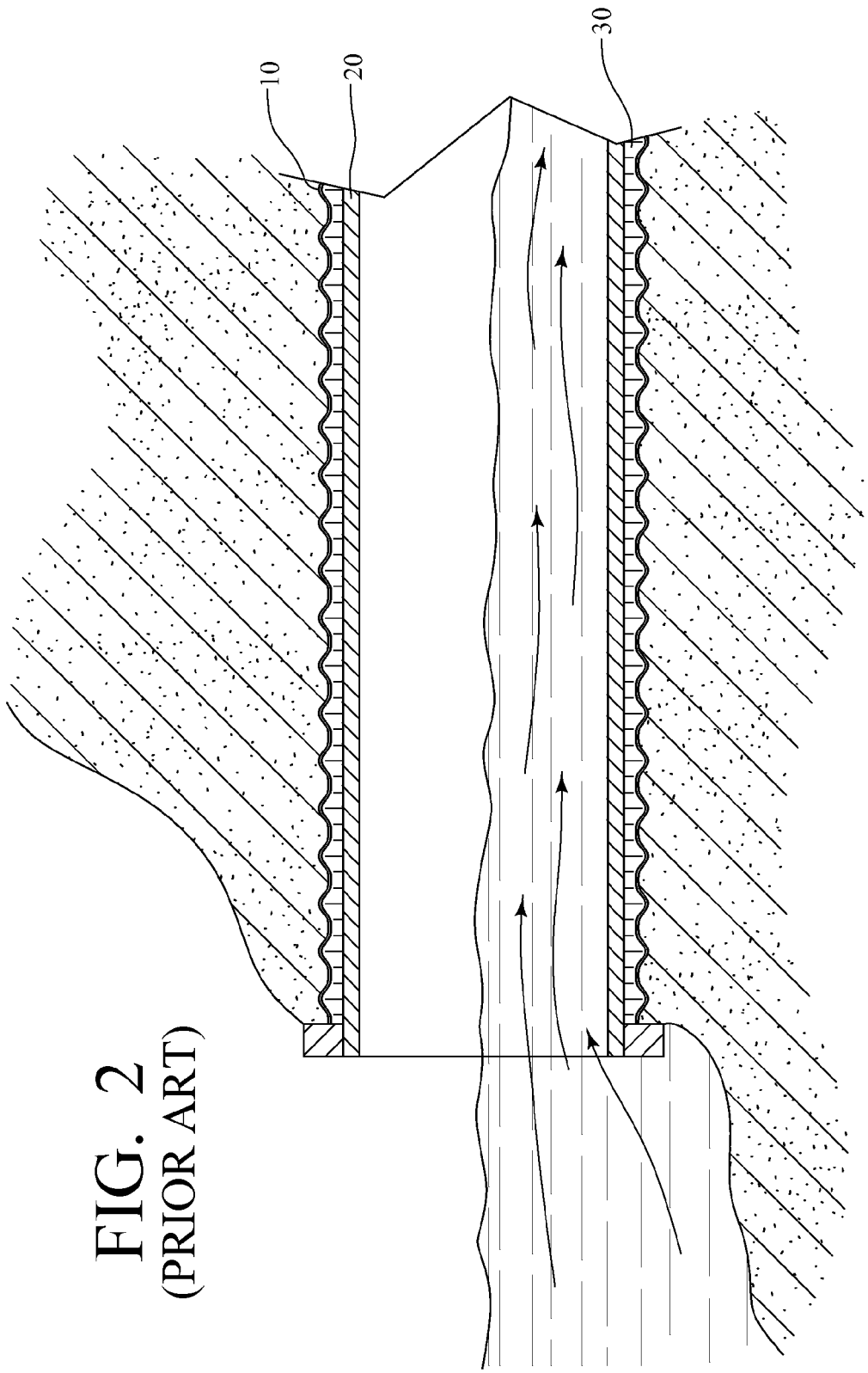
FIG. 2 is the same as FIG. 1, but shows water entering the liner in a low flow condition.

The present invention is a modified pipe inlet for improving flow through a pipe, such as a liner for repairing a failing culvert. This can be achieved by modifying the liner itself or by an attachment that is mated to the liner. In either event, the inner wall surface of the liner or attachment is provided with a waveform-like geometry at the inlet end. Specifically, the waveform-like geometry includes an initial curvature beginning at the inlet end and continuing until reaching a predetermined location where the inner diameter of the liner is minimized, the curvature then continuing with the inner diameter increasing again to a second predetermined location, before the inner diameter again decreases to a third predetermined location and then remains substantially constant along the remaining length of the liner or attachment, thus creating an annular recess in the inner wall surface of the liner or attachment.

Referring now to FIGS. 4-6, in one exemplary embodiment, an attachment 100 for a liner made in accordance with the present invention has a continuous wall defining an inner wall surface 102 and an exterior wall surface 104. The attachment 100 further defines a central fluid passageway 106 extending from an inlet end 108 to an outlet end 110. The attachment 100 has an initial curvature at the inlet (left) end 108 of the attachment 100. In other words, the inner wall surface 102 is provided with an initial curvature at the inlet (left) end 108. Such a curvature continues (moving from left to right in FIGS. 4-6) until reaching a predetermined location—Point A, which is at a distance, $d_1$, from the inlet end 108. At Point A, the inner diameter, $ID_2$, is minimized. Accordingly, the inlet end 108 of the attachment 100 can be characterized as having a flared end or bell-shape. Furthermore, in this exemplary embodiment, at the inlet end 108, the attachment 100 has an outer diameter, $OD_1$, that is essentially the same as the inner diameter, $ID_1$.

Referring still to FIGS. 4-6, such a curvature continues from Point A, with the inner diameter increasing, until reaching a second predetermined location—Point B, which is at a distance, $d_2$, from the inlet end 108. Thus, at point B, the inner diameter, $ID_3$, is greater than the inner diameter, $ID_2$, at Point A. Such a curvature then continues, but with the inner diameter now decreasing, to a third predetermined location—Point C, which is at a distance, $d_3$, from the inlet end 108. The inner diameter, $ID_4$, then remains constant from Point C along the remaining length of the attachment 100. The result is an annular recess 120 created in the inner wall surface 102. In cross-section, and as shown in FIGS. 4-6, because, in this exemplary embodiment, $ID_2$ (Point A) is equal to $ID_4$ (Point C), the boundary of the annular recess 120 in the inner wall surface 102 is in the shape of an arc from Point A to Point B to Point C with a vertex extending to a maximum depth, $h_1$, into the inner wall surface 102. The boundary of the annular recess 120 can be further characterized by the radius of curvature, $R_1$, of the arc and the angle, $\alpha_1$, through which the arc extends from Point A to Point B to Point C.

Figure 7:
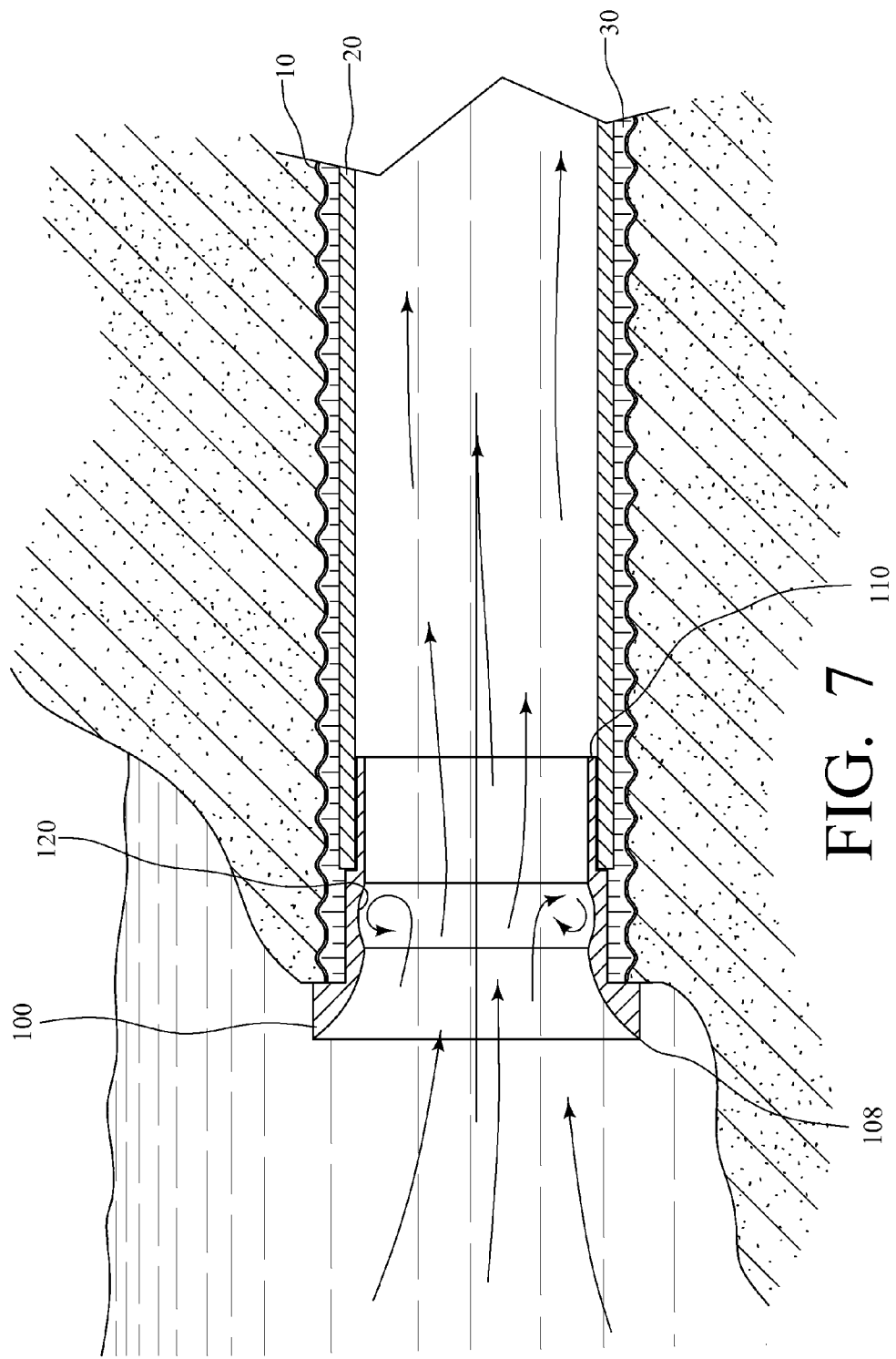
FIG. 7 is a sectional view of the exemplary attachment of FIGS. 4-6 mated to a liner and installed in a corrugated metal pipe of a failing culvert.

Referring now to FIG. 7, in repairing a failing culvert, a liner 20 is inserted into and installed in a corrugated metal pipe 10. The attachment 100 described above with reference to FIGS. 4-6 is then inserted into the pipe 10 and mated with the liner 20. With respect to the mating of the attachment 100 and the liner 20, such mating can be achieved, for example, using the integral end connections described in U.S. Pat. Nos. 4,779,902 and 4,875,714, each of which is incorporated herein by reference. Furthermore, and similar to the prior art constructions discussed above, a grout mixture 30 is packed into the annular space between the pipe 10 and the liner 20 to secure the liner 20 relative to the pipe 10 and to stabilize the surrounding soil.

Referring still to FIG. 7, in a full-flow event, the initial curvature at the inlet end 108 (i.e., the flared end) of the attachment 100 helps to transition the flow from a large area outside of the culvert and into the central fluid passageway 106 of the attachment 100. Then, the annular recess 120 created in the inner wall surface 102 accommodates and effectively moves the small eddies or countercurrents inside of the inlet end 108 out of the way of the streamlined flow.

The exemplary attachment 100 described above would be sized for the particular liner to which it is to be mated. For purposes of example, Table A (below) provides the corresponding numerical dimensions for an exemplary attachment 100 that is sized for a 12-inch liner. As reflected in Table A, certain exterior dimensions are also provided for purposes of example; however, the contours of the external wall surface 104 of the attachment 100 do not have an impact on the flow of water through the central fluid passageway 106 of the attachment 100. Of course, the dimensions presented in Table A could be appropriately scaled to create appropriate attachments for larger or smaller diameter liners.

TABLE A

| | | | |
|---|---|---|---|
| $OD_1$ | 17.50 in. | $h_1$ | 0.34 in. |
| $ID_1$ | 17.50 in. | $R_1$ | 3.66 in. |
| $ID_2$ | 11.97 in. | $\alpha_1$ | 43° |
| $ID_3$ | 12.65 in. | $x_1$ | 3.00 in. |
| $ID_4$ | 11.97 in. | $x_2$ | 9.00 in. |
| $d_1$ | 4.81 in. | $x_3$ | 15.00 in. |
| $d_2$ | 6.60 in. | $y_1$ | 12.75 in. |
| $d_3$ | 8.39 in. | $y_2$ | 14.00 in. |

Figure 10:
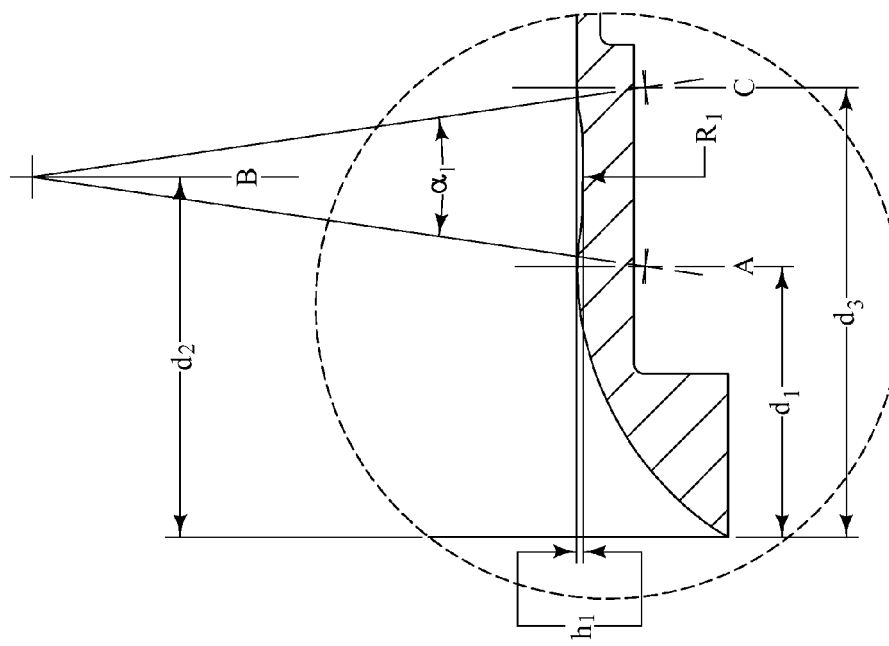
FIG. 10 is an enlarged view of a portion of the sectional view of FIG. 9.
Figure 8:
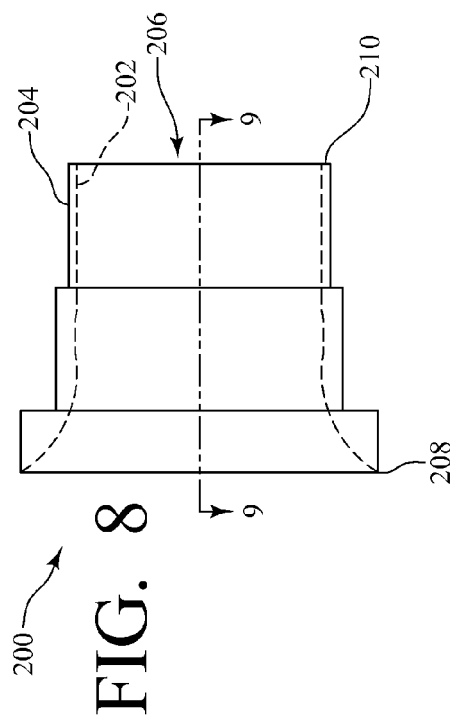
FIG. 8 is a view of another exemplary attachment for a liner made in accordance with the present invention.
Figure 9:
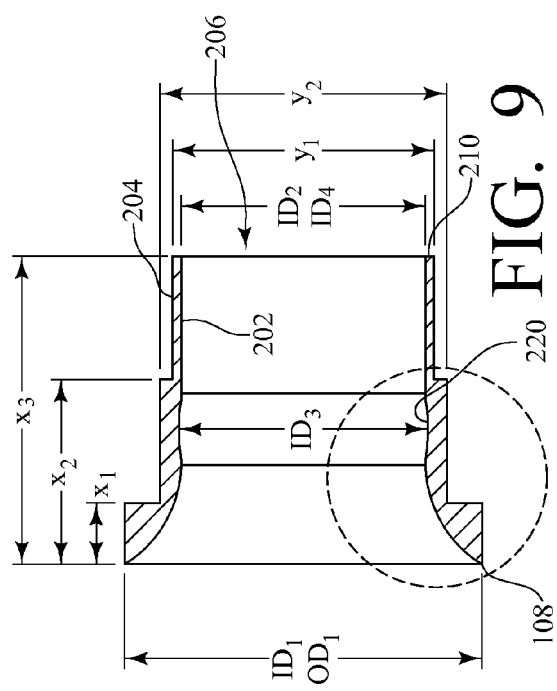
FIG. 9 is a sectional view of the exemplary attachment of FIG. 8, taken along line 9-9 of FIG. 8.

Referring now to FIGS. 8-10, in another exemplary embodiment, an attachment 200 for a liner made in accordance with the present invention again has a continuous wall defining an inner wall surface 202 and an exterior wall surface 204. The attachment 200 further defines a central fluid passageway 206 extending from an inlet end 208 to an outlet end 210. The attachment 200 again has an initial curvature at the inlet (left) end 208 of the attachment 200. In other words, the inner wall surface 202 is provided with an initial curvature at the inlet (left) end 208. Such a curvature continues (moving from left to right in FIGS. 8-10) until reaching a predetermined location—Point A, which is at a distance, $d_1$, from the inlet end 208. At Point A, the inner diameter, $ID_2$, is minimized. Accordingly, the inlet end 208 of the attachment 100 can again be characterized as having a flared end or bell-shape.

Referring still to FIGS. 8-10, such a curvature continues from Point A, with the inner diameter increasing, until reaching a second predetermined location—Point B, which is at a distance, $d_2$, from the inlet end 208. Thus, at point B, the inner diameter, $ID_3$, is greater than the inner diameter, $ID_2$, at Point A. Such a curvature then continues, but with the inner diameter now decreasing, to a third predetermined location—Point C, which is at a distance, $d_3$, from the inlet end 208. The inner diameter, $ID_4$, then remains constant from Point C along the remaining length of the attachment 200. The result again is an annular recess 220 created in the inner wall surface 202. In cross-section, and as shown in FIGS. 9-10, the boundary of the annular recess 220 in the inner wall surface 202 is again in the shape of an arc from Point A to Point B to Point C with a vertex extending to a maximum depth, $h_1$, into the inner wall surface 202. However, as can be seen in comparing the exemplary attachment 200 of FIGS. 8-10 to the exemplary attachment 100 of FIGS. 4-7, in this case, the annular recess 220 is much more shallow, with a maximum depth, $h_1$, that is approximately equal to 1.0% of the inner diameter, $ID_4$. The boundary of the annular recess 220 can again be further characterized by the radius of curvature, $R_1$, of the arc and the angle, $\alpha_1$, through which the arc extends from Point A to Point B to Point C.

The exemplary attachment 200 would function in the same manner as the exemplary attachment 100 described above with references to FIGS. 4-7, mating with a liner installed in a failing culvert. In a full-flow event, the initial curvature at the inlet end 208 (i.e., the flared end) of the attachment 200 helps to transition the flow from a large area outside of the culvert and into the central fluid passageway 206 of the attachment 200. Then, the annular recess 220 created in the inner wall surface 202 accommodates and effectively moves the small eddies or countercurrents inside of the inlet end 208 out of the way of the streamlined flow.

For purposes of example, Table B (below) provides the corresponding numerical dimensions for an exemplary attachment 200 that is sized for a 12-inch liner. Of course, the dimensions presented in Table B could again be appropriately scaled to create appropriate attachments for larger or smaller diameter liners.

TABLE B

| | | | |
|---|---|---|---|
| $OD_1$ | 17.50 in. | $h_1$ | 0.12 in. |
| $ID_1$ | 17.50 in. | $R_1$ | 11.79 in. |
| $ID_2$ | 11.97 in. | $\alpha_1$ | 17° |
| $ID_3$ | 12.21 in. | $x_1$ | 3.00 in. |
| $ID_4$ | 11.97 in. | $x_2$ | 9.00 in. |
| $d_1$ | 4.97 in. | $x_3$ | 15.00 in. |
| $d_2$ | 6.60 in. | $y_1$ | 12.75 in. |
| $d_3$ | 8.24 in. | $y_2$ | 14.00 in. |

Figure 13:
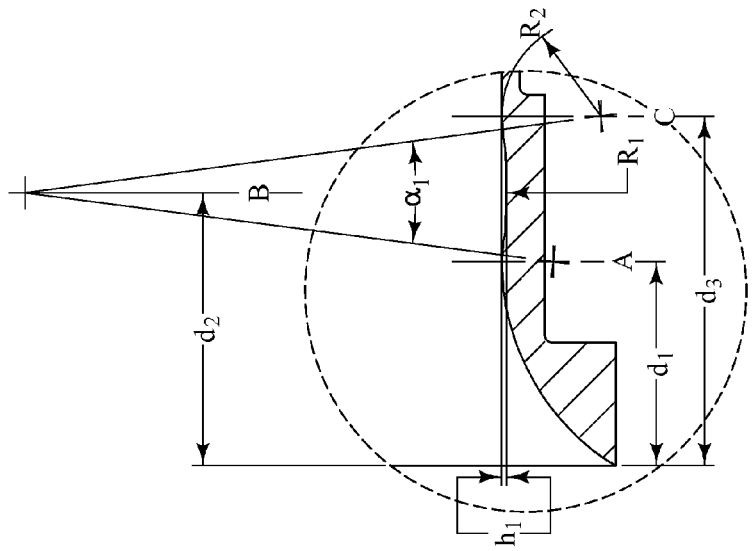
FIG. 13 is an enlarged view of a portion of the sectional view of FIG. 12.
Figure 11:
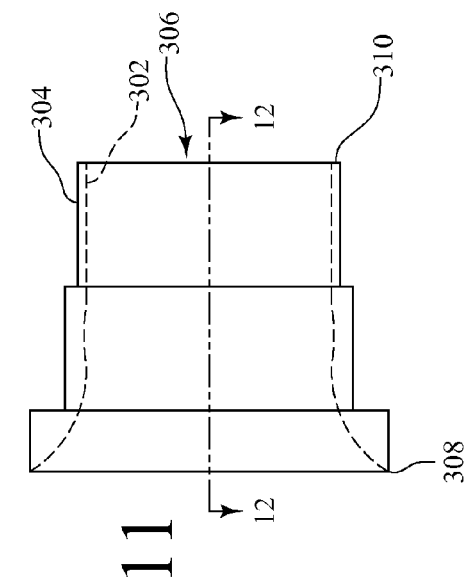
FIG. 11 is a view of another exemplary attachment for a liner made in accordance with the present invention.
Figure 12:
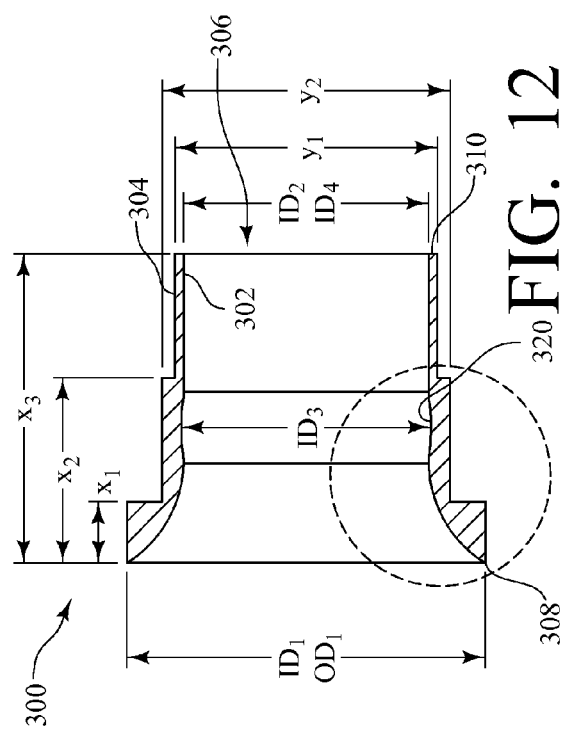
FIG. 12 is a sectional view of the exemplary attachment of FIG. 11, taken along line 12-12 of FIG. 11.

Referring now to FIGS. 11-13, in another exemplary embodiment, an attachment 300 for a liner made in accordance with the present invention again has a continuous wall defining an inner wall surface 302 and an exterior wall surface 304. The attachment 300 further defines a central fluid passageway 306 extending from an inlet end 308 to an outlet end 310. The attachment 300 again has an initial curvature at the inlet (left) end 308 of the attachment 300. In other words, the inner wall surface 302 is provided with an initial curvature at the inlet (left) end 308. Such a curvature continues (moving from left to right in FIGS. 11-13) until reaching a predetermined location—Point A, which is at a distance, $d_1$, from the inlet end 308. At Point A, the inner diameter, $ID_2$, is minimized. Accordingly, the inlet end 308 of the attachment 300 can again be characterized as having a flared end or bell-shape.

Referring still to FIGS. 11-13, such a curvature continues from Point A, with the inner diameter increasing, until reaching a second predetermined location—Point B, which is at a distance, $d_2$, from the inlet end 308. Thus, at point B, the inner diameter, $ID_3$, is greater than the inner diameter, $ID_2$, at Point A. Such a curvature then continues, but with the inner diameter now decreasing, to a third predetermined location—Point C, which is at a distance, $d_3$, from the inlet end 308. The inner diameter, $ID_4$, then remains constant from Point C along the remaining length of the attachment 300. The result again is an annular recess 320 created in the inner wall surface 302. In cross-section, and as shown in FIGS. 11-13, the boundary of the annular recess 320 in the inner wall surface 302 is again in the shape of an arc from Point A to Point B to Point C with a vertex extending to a maximum depth, $h_1$, into the inner wall surface 302. The boundary of the annular recess 320 can again be further characterized by the radius of curvature, $R_1$, of the arc and the angle, $\alpha_1$, through which the arc extends from Point A to Point B to Point C.

However, as can be seen in comparing the exemplary attachment 300 of FIGS. 11-13 to the exemplary attachment 200 of FIGS. 8-10, in this case, the annular recess 320 extends over a slightly larger distance, i.e., the distance between Point A and Point C. In this regard, there is a small transitional curvature just past Point A leading into the annular recess 320. There is also a small transitional curvature just before Point C leading out of the annular recess 320, with a radius of curvature, $R_2$, that is approximately equal to 20% of the inner diameter, $ID_4$.

The exemplary attachment 300 would function in the same manner as the exemplary attachment 100 described above with reference to FIGS. 4-7, mating with a liner installed in a failing culvert. In a full-flow event, the initial curvature at the inlet end 308 (i.e., the flared end) of the attachment 300 helps to transition the flow from a large area outside of the culvert and into the central fluid passageway 306 of the attachment 300. Then, the annular recess 320 created in the inner wall surface 302 accommodates and effectively moves the small eddies or countercurrents inside of the inlet end 308 out of the way of the streamlined flow.

For purposes of example, Table C (below) provides the corresponding numerical dimensions for an exemplary attachment 300 that is sized for a 12-inch liner. Of course, the dimensions presented in Table C could again be appropriately scaled to create appropriate attachments for larger or smaller diameter liners.

TABLE C

| | | | |
|---|---|---|---|
| $OD_1$ | 17.50 in. | $h_1$ | 0.12 in. |
| $ID_1$ | 17.50 in. | $R_1$ | 11.79 in. |
| $ID_2$ | 11.97 in. | $R_1$ | 2.40 in. |
| $ID_3$ | 12.21 in. | $\alpha_1$ | 15° |
| $ID_4$ | 11.97 in. | $x_1$ | 3.00 in. |
| $d_1$ | 4.81 in. | $x_2$ | 9.00 in. |
| $d_2$ | 6.60 in. | $x_3$ | 15.00 in. |
| $d_3$ | 8.55 in. | $y_1$ | 12.75 in. |
| | | $y_2$ | 14.00 in. |

Irrespective of which exemplary attachment 100, 200, 300 is used, the annular recess 120, 220, 320 created by the waveform-like geometry provided in the inner wall surface 102, 202, 302 of the attachment 100, 200, 300 accommodates and effectively moves the small eddies or countercurrents inside of the inlet end 108, 208, 308 out of the way of the streamlined flow. To the extent that such an attachment 100, 200, 300 is used, the present invention may be characterized as a liner system that includes a liner and one of the above-described attachments 100, 200, 300 mated to the liner.

Figure 16:
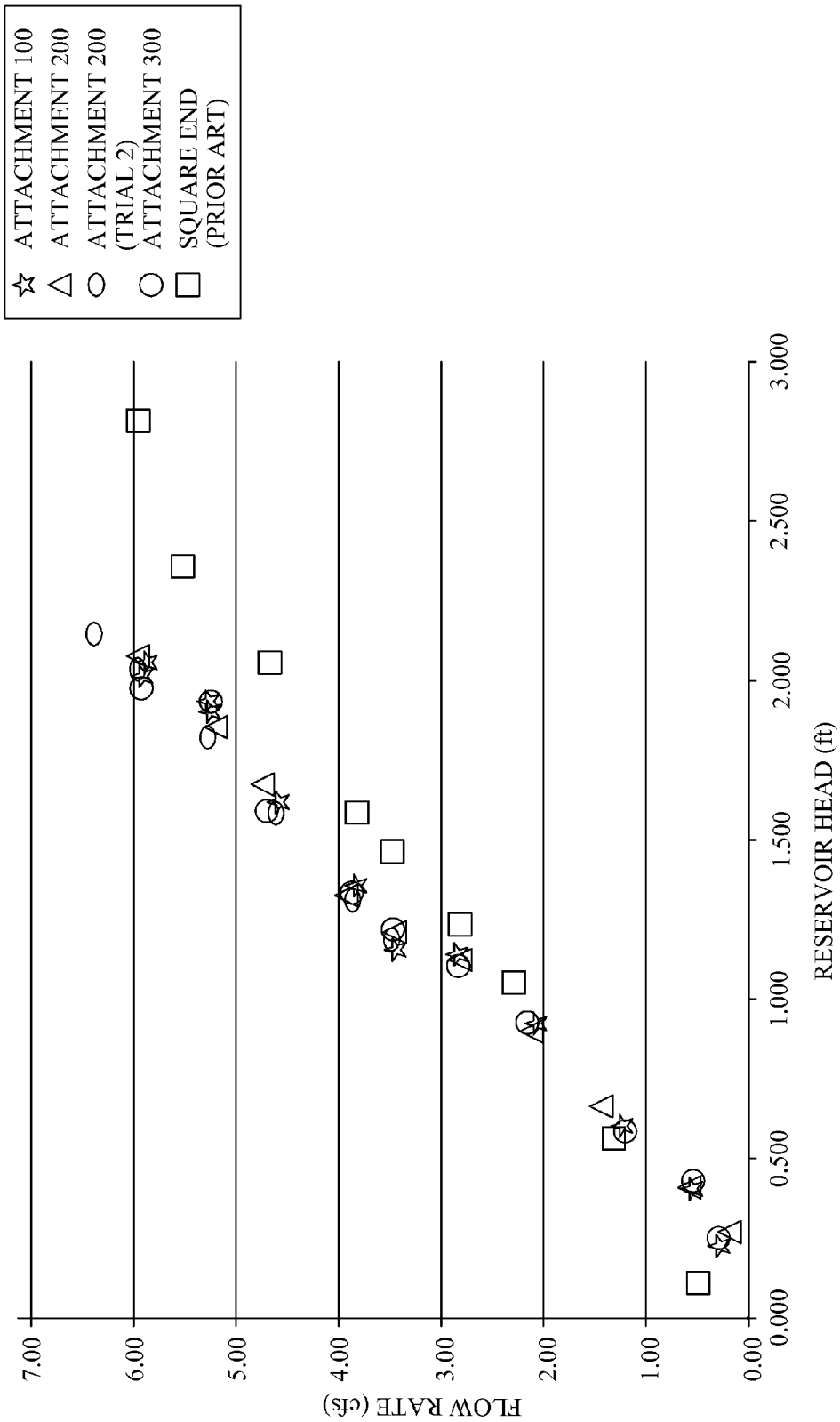
FIG. 16 is a chart of experimental data illustrating head pressure versus flow rate for a liner with no curvature or contour at or near the inlet end of the liner as compared to the flow rate using the attachments illustrated in FIGS. 4-6, 8-10, and 11-13.

FIG. 16 is a chart of experimental data illustrating head pressure versus flow rate for a liner with no curvature or contour at or near the inlet end of the liner (as in many prior art constructions) as compared to the flow rate using the attachments 100, 200, 300 illustrated in FIGS. 4-6, 8-10, and 11-13. As shown in FIG. 16, in low-flow condition (i.e., at minimal head pressures), there is no appreciable difference between flow rates. However, as the head pressure increases, such as during a heavy storm or other full-flow event, the use of the attachments 100, 200, 300 results in an improved flow rate. In this regard, in this particular set of experimental data, it appeared that the attachment 200 illustrated in FIGS. 8-10 provided the best results. As mentioned above, in this particular embodiment, the annular recess 220 has a maximum depth, $h_1$, that is approximately equal to 1.0% of the inner diameter, $ID_4$.

Figure 3:
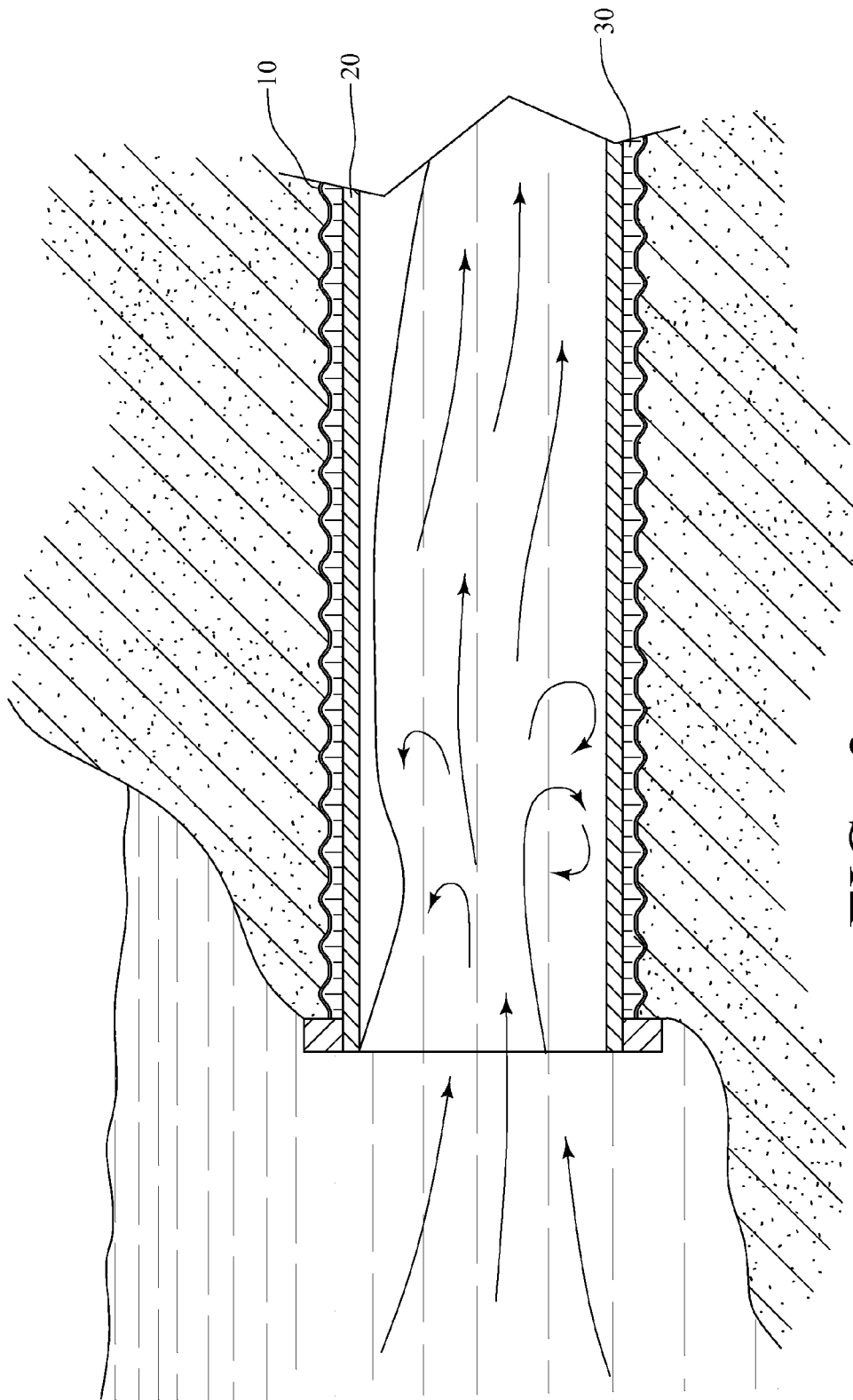
FIG. 3 is the same as FIG. 1, but shows water entering the liner in a full-flow event.

In additional to improved flow rate, it is also believed that the modified inlet also provides some further benefits. For example, referring again to FIG. 3, the constriction of the influent as a result of turbulence many also lead to a siphoning effect, which can make a pipe more prone to collapse as a result of water velocities and forces that exceed normal conditions. By effectively moving the small eddies or countercurrents inside of the inlet end out of the way of the streamlined flow, the likelihood of such a siphoning effect is also minimized. Thus, the used of the modified inlet can prolong the stability and life of the culvert, while at the same time providing a more stable environment upstream.

Figure 14:
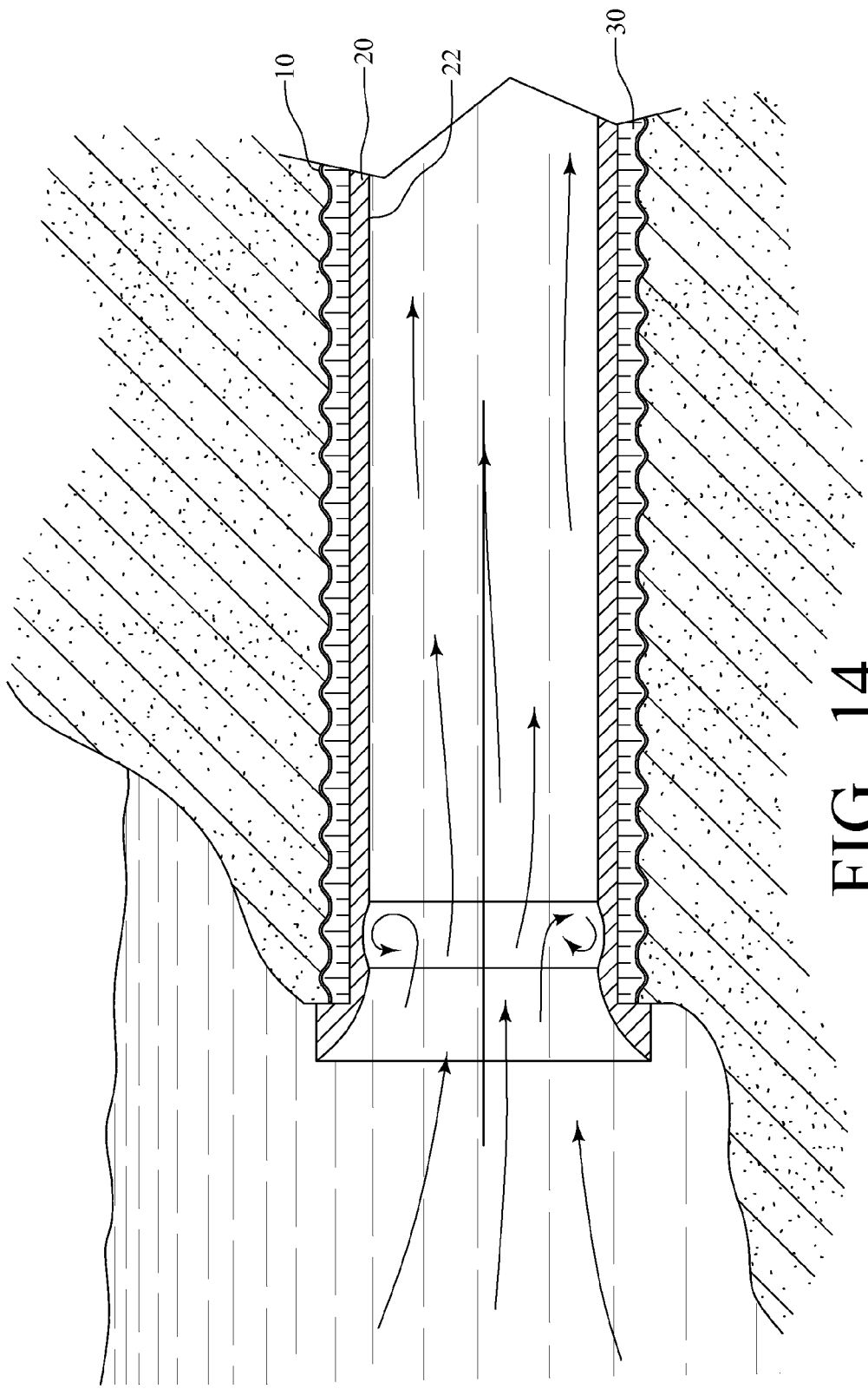
FIG. 14 is a sectional view of a liner installed in a corrugated metal pipe of a failing culvert and having a modified inlet in accordance with the present invention.

Furthermore, it should again be recognized that the same result can be achieved by modifying the liner itself, rather than securing an attachment to a liner. In other words, and as shown in FIG. 14, the inner wall surface 22 of the liner 20 is provided with the waveform-like geometry at the inlet end, such that there is annular recess created in the inner wall surface 22 of the liner 20.

Figure 15:
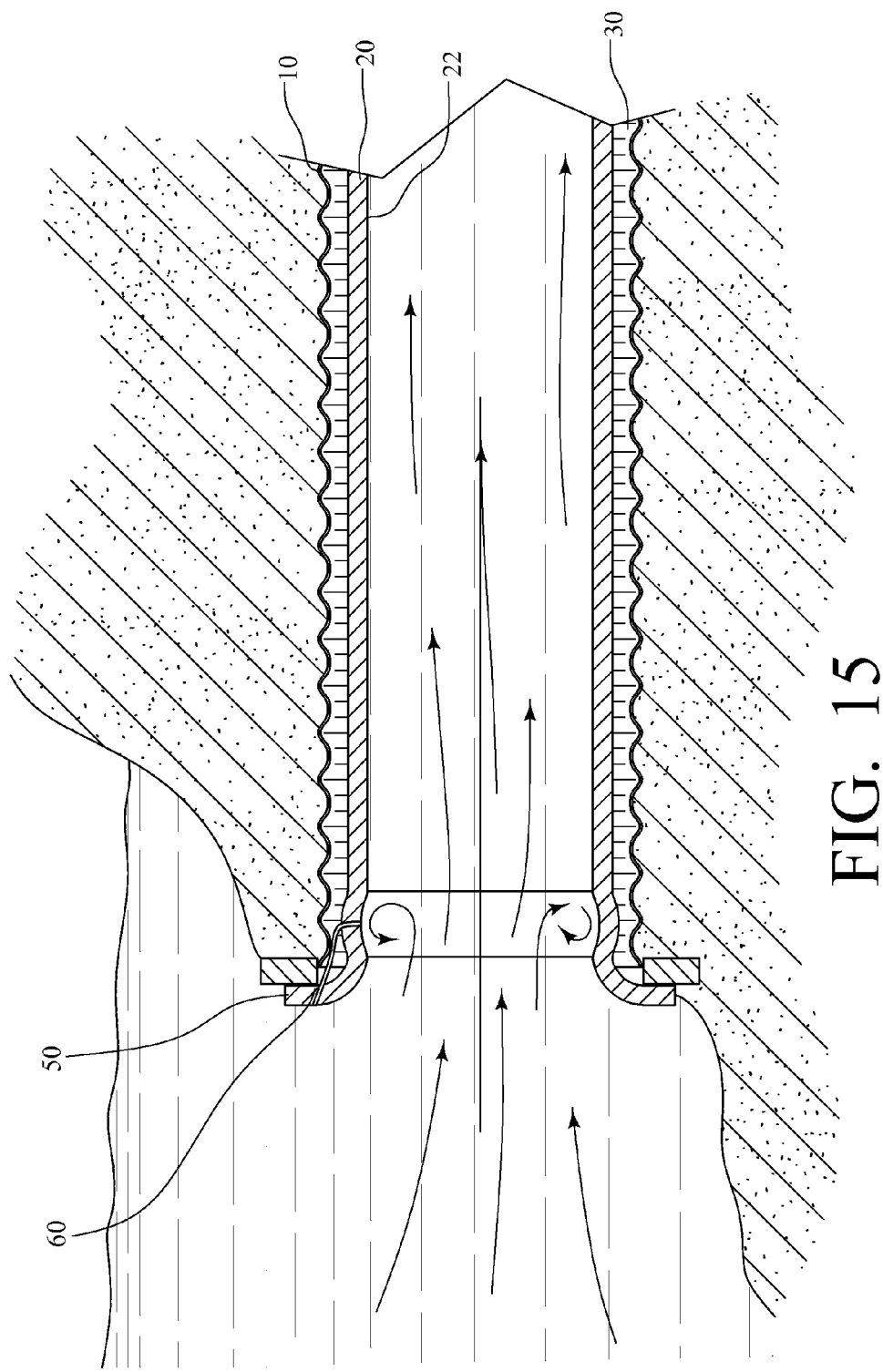
FIG. 15 is a sectional view of a liner installed in a corrugated metal pipe of a failing culvert and having a modified inlet in accordance with the present invention, and further showing the incorporation of a channeling flow preventer and vent into the modified inlet.

As a further refinement, in some installations of a liner system for repairing a failing culvert, a channeling flow preventer is used to assist in concrete forming when a concrete headwall is poured in place and prevents the flow of water from channeling parallel to the longitudinal axis of the pipe. Channeling of water carries particles of soil away from the pipe backfill envelope. The channeling flow preventer thus acts as a water stop, preventing or minimizing the flow of water parallel to the longitudinal axis of the pipe. In the context of the present invention, and as shown in FIG. 15, a channeling flow preventer (which is generally indicated by reference numeral 50) can be formed as an integral part of the liner 20 (or as part of an attachment to the liner), and further serves as the initial curvature of the waveform-like geometry at the inlet end of the liner 20.

As a further refinement, any of the above attachments (FIGS. 4-13) or liners with a modified inlet (FIGS. 14-15) may be provided with a vent. As shown in FIG. 15, such a vent 60 would preferably be located in the vicinity of the annular recess and would equalize pressure in the vicinity of the turbulence (or vena contracta). Venting this area to atmospheric pressure should have a positive effect on flow rate by increasing the available cross-sectional area for flow in the plane of the vena contracta.

Finally, although the modified pipe inlet described above has a particular applicability to culvert repair and the use of a liner, it is contemplated that a similar inlet modification could be used in other pipes or conduits for various storm water and drainage applications without departing from the spirit and scope of the present invention. In other words, since the modified pipe inlet of the present invention maximizes the hydraulic efficiency (i.e., reduces head losses) of a pipe or conduit by reducing the turbulent flow as water or other fluids enter the pipe or conduit, the modified pipe inlet of the present invention could be used anywhere fluid enters a pipe or conduit under gravity or pressure flow. Furthermore, the modified pipe inlet of the present invention may have particular applicability in areas where development has increased the amount of runoff waters, allowing for an increased flow rate without having to replace the existing pipe.

One of ordinary skill in the art will also recognize that additional embodiments and/or applications are possible without departing from the teachings of the present invention. This detailed description, and particularly the specific details of the exemplary embodiments and applications disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A liner system for repairing a failing culvert, comprising:
   a liner;
   an attachment mated to an inlet of the liner, said attachment defining a central fluid passageway extending from an inlet end to an outlet end, and said attachment having an inner wall surface that defines a sinusoidal waveform geometry near the inlet end and around a circumference of the inner wall surface for directing fluid into the liner, the sinusoidal waveform geometry consisting of a curvature beginning at the inlet end of the attachment where an inner diameter of the attachment is maximized and continuing until reaching a first predetermined location where the inner diameter of the attachment is minimized, the curvature then continuing with the inner diameter immediately increasing again to a second predetermined location, before the inner diameter again decreases to a third predetermined location, thus creating a single annular recess in the inner wall surface of the attachment, which, in cross-section, forms a continuous arc in the inner wall surface of the attachment extending from the first predetermined location to the second predetermined location to the third predetermined location.

2. The liner system as recited in claim 1, in which the annular recess has a maximum depth that is approximately equal to 1.0% of an inner diameter of the attachment.

3. The liner system as recited in claim 1, wherein, immediately after the third predetermined location, the inner diameter remains substantially constant along the remaining length of the attachment.

4. The liner system as recited in claim 1, wherein the inner diameter of the attachment at the first predetermined location is substantially identical to the inner diameter of the attachment at the third predetermined location.

5. An attachment for a pipe comprising a continuous wall defining an inner wall surface and an exterior wall surface, said attachment further defining a central fluid passageway extending from an inlet end to an outlet end, wherein the inner wall surface defines a sinusoidal waveform geometry near the inlet end and around a circumference of the inner wall surface, the sinusoidal waveform geometry consisting of a curvature beginning at the inlet end of the attachment where an inner diameter of the attachment is maximized and continuing until reaching a first predetermined location where the inner diameter of the attachment is minimized, the curvature then continuing with the inner diameter immediately increasing again to a second predetermined location, before the inner diameter again decreases to a third predetermined location, thus creating a single annular recess in the inner wall surface of the attachment, which, in cross-section, forms a continuous arc in the inner wall surface of the attachment extending from the first predetermined location to the second predetermined location to the third predetermined location.

6. The attachment as recited in claim 5, in which the annular recess has a maximum depth that is approximately equal to 1.0% of an inner diameter of the attachment.

7. The attachment as recited in claim 5, wherein, immediately after the third predetermined location, the inner diameter remains substantially constant along the remaining length of the attachment.

8. The attachment as recited in claim 5, wherein the inner diameter of the attachment at the first predetermined location is substantially identical to the inner diameter of the attachment at the third predetermined location.

9. A liner for repairing a failing culvert, comprising a continuous wall defining an inner wall surface and an exterior wall surface, said liner further defining a central fluid passageway extending from an inlet end to an outlet end, wherein the inner wall surface defines a sinusoidal waveform geometry near the inlet end and around a circumference of the inner wall surface, the sinusoidal waveform geometry consisting of a curvature beginning at the inlet end of the liner where an inner diameter of the liner is maximized and continuing until reaching a first predetermined location where the inner diameter of the liner is minimized, the curvature then continuing with the inner diameter immediately increasing again to a second predetermined location, before the inner diameter again decreases to a third predetermined location, thus creating a single annular recess in the inner wall surface of the liner, which, in cross-section, forms a continuous arc in the inner wall surface of the liner extending from the first predetermined location to the second predetermined location to the third predetermined location.

10. The liner as recited in claim 9, in which the annular recess has a maximum depth that is approximately equal to 1.0% of an inner diameter of the attachment.

11. The liner as recited in claim 9, wherein, immediately after the third predetermined location, the inner diameter remains substantially constant along the remaining length of the liner.

12. The liner as recited in claim 9, wherein the inner diameter of the liner at the first predetermined location is substantially identical to the inner diameter of the liner at the third predetermined location.

13. A pipe comprising a continuous wall defining an inner wall surface and an exterior wall surface, said pipe further defining a central fluid passageway extending from an inlet end to an outlet end, wherein the inner wall surface defines a sinusoidal waveform geometry near the inlet end and around a circumference of the inner wall surface, said sinusoidal waveform geometry consisting of a curvature beginning at the inlet end of the pipe where an inner diameter of the pipe is maximized and continuing until reaching a first predetermined location where the inner diameter of the pipe is minimized, the curvature then continuing with the inner diameter immediately increasing again to a second predetermined location, before the inner diameter again decreases to a third predetermined location, thus creating a single annular recess in the inner wall surface of the pipe, which, in cross-section, forms a continuous arc in the inner wall surface of the pipe extending from the first predetermined location to the second predetermined location to the third predetermined location.

14. The pipe as recited in claim 13, wherein, immediately after the third predetermined location, the inner diameter remains substantially constant along the remaining length of the pipe.

15. The pipe as recited in claim 13, wherein the inner diameter of the pipe at the first predetermined location is substantially identical to the inner diameter of the pipe at the third predetermined location.

* * * * *